United States Patent [19]

Sarullo

[11] Patent Number: 5,134,973
[45] Date of Patent: Aug. 4, 1992

[54] CAT HOUSE

[76] Inventor: Salvatore Sarullo, 767 Hillwood Dr. NE., Marietta, Ga. 30068

[21] Appl. No.: 726,356

[22] Filed: Jul. 5, 1991

[51] Int. Cl.$^5$ .................................. A01K 1/035
[52] U.S. Cl. ........................................... 119/165
[58] Field of Search ............ 119/15, 19, 161, 165, 119/168

[56] References Cited

U.S. PATENT DOCUMENTS

| | | | |
|---|---|---|---|
| 3,428,026 | 2/1969 | Sohmers et al. | 119/19 |
| 4,348,982 | 9/1982 | Selby | 119/168 |
| 4,640,228 | 2/1987 | Sedlacek et al. | 119/15 |
| 4,690,100 | 9/1987 | Thomas | 119/15 |
| 4,696,257 | 9/1989 | Neary et al. | 119/19 X |
| 5,014,649 | 5/1991 | Taft | 119/168 |
| 5,044,316 | 9/1991 | Thomas | 119/15 |
| 5,044,325 | 9/1991 | Miksitz | 119/165 |

FOREIGN PATENT DOCUMENTS

| | | | |
|---|---|---|---|
| 2618050 | 1/1889 | France | 119/168 |
| 9007269 | 7/1990 | World Int. Prop. O. | 119/168 |

Primary Examiner—Gene Mancene
Assistant Examiner—Thomas Price
Attorney, Agent, or Firm—Alfred E. Wilson

[57] ABSTRACT

There are more than sixty million cats in the United States according to the statistics of ABI Informer. My filtering system takes advantage of the facts that (1) air that has the odor of cats in it is slightly lighter than is air that does not have cat odor in it. (2) If air having odors in it are forced to change their direction of travel, the odor containing air will give up its odors. (3) Charcoal is an ideal substance to neutralize cat odors. Air saturated with charcoal will kill fleas, or make them to somewhere else to live. A perforated charcoal carrying tray, having an unperforated central area of approximately 10 to 15% of the area of the tray is positioned above the litter box, to permit the cat to use the litter box in the normal way, and wherein the unperforated central area forces the rising air to deflect its course to induce perimeter filtration, and wherein the rising air strikes the roof convering the charcoal tray, and is deflected back into the charcoal where the cat odor remains substantially dormat until the charcoal is changed. Most of the concentrated air will remain in the charcoal tray, and that the lesser concentrations will escape back to the area beneath the charcoal tray. A hooded doorway is provided for the cat to enter and leave the cat house, and the hood prevents the escape of odors to the home. Insofar as is known this is the only fully enclosed filter system that has been developed. This unit is unique because substantially no odor escapes to the home.

5 Claims, 3 Drawing Sheets

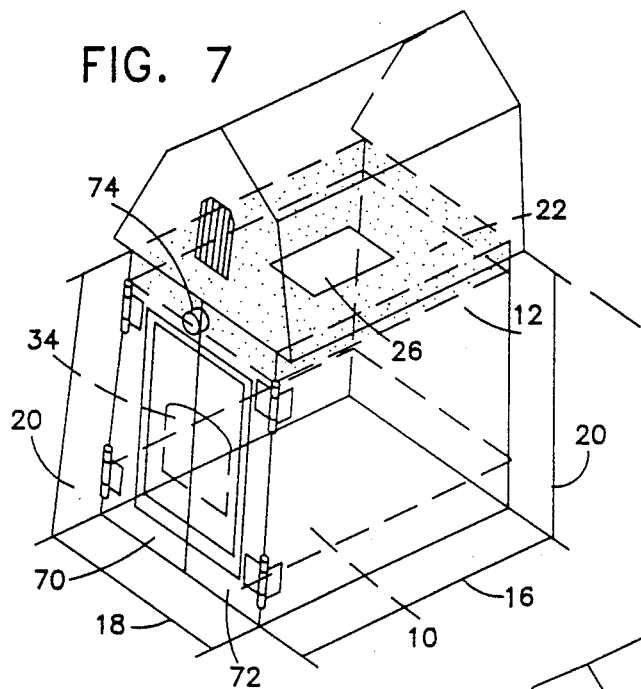
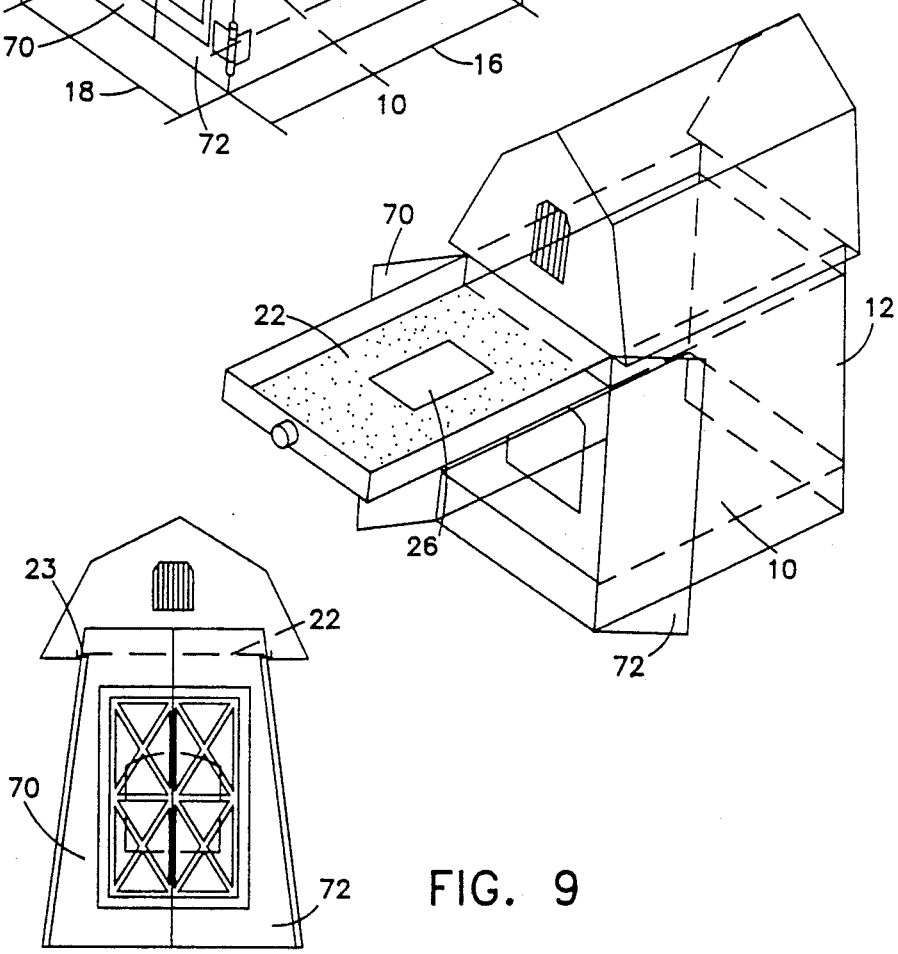

CAT HOUSE

BACKGROUND OF THE INVENTION

It has been determined that charcoal is a good disinfectant for cat odors, particularly the odors that are developed around the litter box. (/It has also been determined that charcoal will either kill fleas, or induce them to go somewhere else to live.

When these two problems, the odor problem and the problem of fleas can be effectively controlled, more people will want to have the stabilizing influence of a good cat in the home, particularly families having children growing up.

Taking advantage of these facts a cat house has been developed where a cat house has a tray for charcoal having a series of closely spaced apertures of approximately ⅜" areas are positioned above the litter box, and wherein an uninterrupted central area is provided to force odors from the litter box to change direction to flow up through the outer perforated edges of the perforated charcoal pan. It has also been determined that if air containing odors are forced to change their direction of flow, the odors will be dissipated. It is thus apparent that a cat house has been devised where the odor from the litter box is reduced to the point that it is not so obnoxious that people would rather not have a cat.

FIELD OF THE INVENTION

Home owners enjoy having cats, particularly where children are growing up. The home owners have evidenced a willingness to endure bad odors and the problem of fleas for the sake of having the stabilizing influence of an affectionate and good cat.

DESCRIPTION OF THE PRIOR ART

Insofar as is known, no one has ever used the subject filtering system which insures a substantially odorless litter box system and which has not been done before.

Other people have attempted to use charcoal as a disinfectant but no one, insofar as is presently known, has used it in the way that it is used herein. That is by taking advantage of the facts that air with cat odors are slightly lighter than is air without cat odors, and trapping the odorous air in the charcoal and permitting the odors to be trapped and deflected off of the ceiling of the subject cat house and settling back into the charcoal where it is absorbed by the charcoal and the more potent of the odors remain there until the charcoal is again changed. In this connection it will be noted that the air having the heaviest concentrations of odors will remain in the charcoal, and that air having the lighter concentrations of cat odors will flow back towards the litter box.

SUMMARY OF THE INVENTION

The substantially odorless cat house with its unique filtering system is designed to fit over the cat's litter box with the broken up charcoal filtering medium positioned above the litter box on a perforated charcoal support tray.

The odors from the cat and the litter box penetrate the charcoal support plate positioned above the litter box, and settle in the charcoal and remain there, dependent on the length of time since the charcoal was changed. The charcoal will last for a period of several months before it is necessary to rejuvenate the unit with a fresh supply of regular charcoal. For best results, it is recommended that the charcoal be changed, and a fresh supply of regular charcoal be applied every four to six months. For best results, it is also recommended that the litter box be attended to on a weekly or even more frequent basis, and that a new supply of litter be provided.

BRIEF DESCRIPTION OF THE DRAWINGS

Referring now to the drawings, wherein similar reference numerals refer to similar parts throughout the several views;

FIGS. 7, 8, and 9 are also views similar to FIGS. 1, 2 and 3 showing the so-called Red Barn style of architecture.

DESCRIPTION OF A PREFERRED EMBODIMENT

Cats are essentially a very lovable animal, and they are an excellent house pet, particularly in families having growing children. Many people who presently do not have a cat as a house pet would have a cat if it were not for the facts that many people object vigorously to the presence of a smelly litter box, and it is difficult to put the cat out on a sufficiently regular basis to preclude the occurrence of accidents when the cat was not let out at the crucial time. This coupled with the fact that cats generally have fleas, and the fact that it is difficult to keep the flea problem under control has led many families to forego having a cat.

After extensive experimentation and test, there has been developed a litter control system that minimizes both of these problems with minimal care by the householder, and at very nominal expense.

A litter control system whereby a litter box of virtually any size and shape can, with minimal care, be taken care of on a basis that virtually no smelly odors will emanate from the litter box.

It has also been discovered after extensive experimentation and testing, that odor laden air is somewhat lighter than is air that does not contain odors, particularly cat litter box odors. It has also been found that if a moving odorous air stream is forced to change its flow direction will aid in dispersing the odorous air stream, thus reducing odors.

It has also been learned that fleas cannot tolerate charcoal fumes, and will either be killed or will find another place to live rather than to live where they are subjected to the fumes of charcoal.

With these fundamental facts in mind, a system to combat the twofold problems of reducing the odors and getting rid of fleas was developed.

Figure 1:
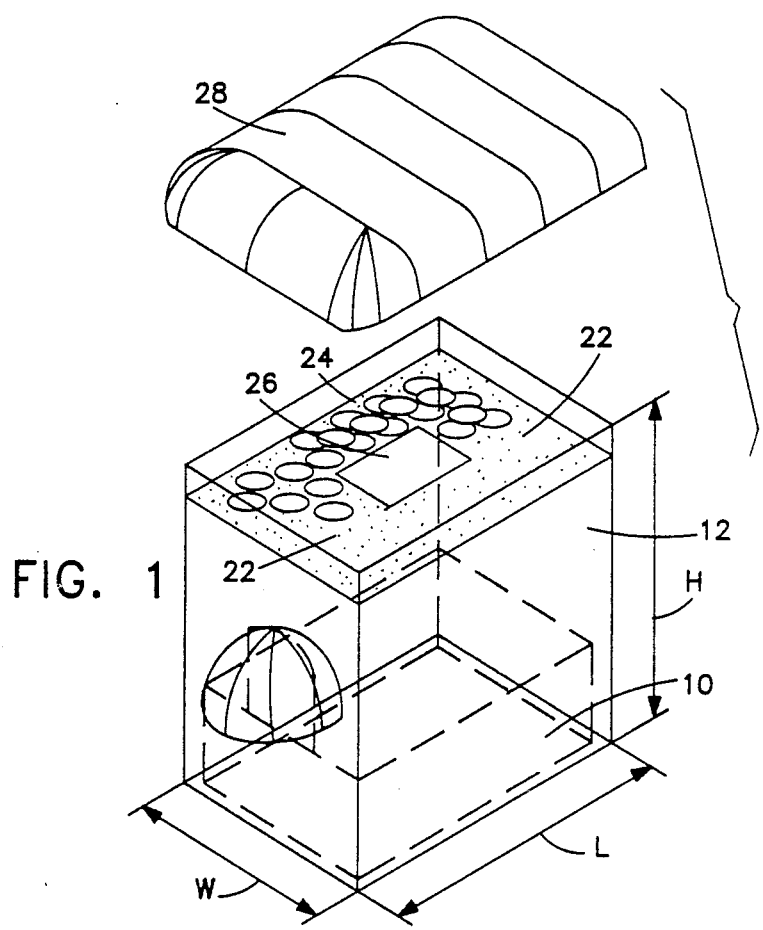
FIG. 1 is a partially exploded perspective view of the substantially odorless cat house wherein the cat house is positioned over a cat litter box, and embodying the so-called European styling.
Figure 2:
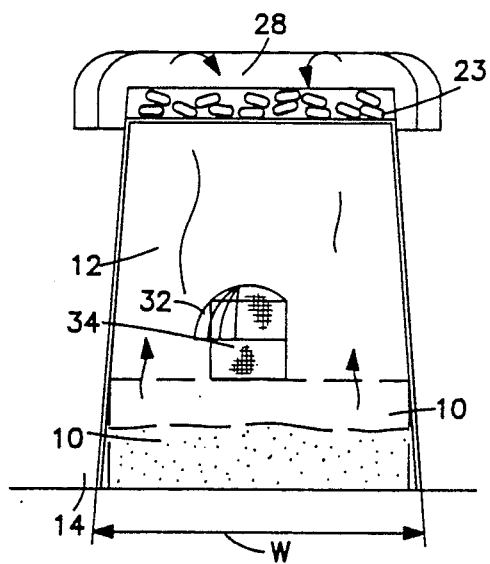
FIG. 2 is a front elevational view of the assembly of FIG. 1.
Figure 3:
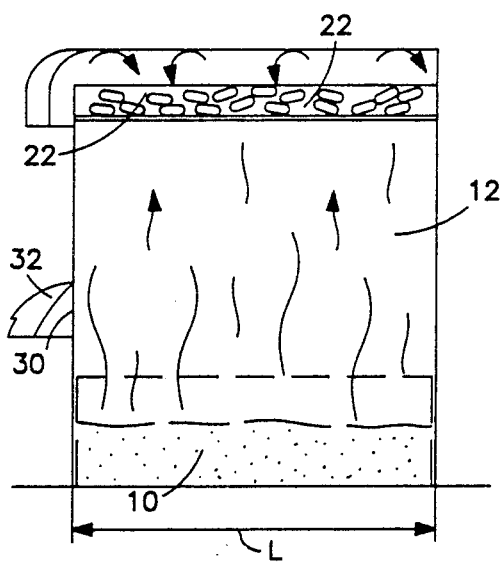
FIG. 3 is a side elevational view of the device illustrated in FIGS. 1 and 2.

Rather than to attempt to provide a setting that would harmonize with every style of architecture, there has been devised a so-called European style of architecture as embodied herein in FIGS. 1 to 3 which many people like.

A cat's litter box 10 is shown in dotted lines in all of the FIGS. 1 to 9. A rectangular shell, sleeve or cat house 12 is positioned over the litter box 10 and is supported on the same homesite floor as is the litter box 10.

The cat's litter box 10 can for example be of any conventional size, preferably rectangular, although this invention will work very well with any shape of litter box 10. The litter box 10 can for example be twenty-four inches in length, L by eighteen inches wide W, and the litter box should have sides three or four inches high to prevent the litter from being scattered when the cat scratches as they generally do when they visit the litter box.

The cat house 12 which fits over the litter box 10 is approximately twenty-four inches in height H to provide adequate space above the litter in the box for the cat to utilize the litter box 10 in the usual way.

A charcoal support tray 22 is positioned on a ledge 23 in the rectangular shell 12. A charcoal support tray 22 having side edges 24 extending up around the tray 22 for three or four inches is provided to confine the charcoal 21 which should preferably be regular charcoal which is quite inexpensive. The charcoal should be crushed or broken up so as not to permit the charcoal from preventing the closing of the removable roof 28. If desired, a ledge can be provided to position the charcoal plate 22 where it should be with reference to the height H of the shell 12.

The charcoal tray 22 should, as a minimum, be separated from the surface of the litter in the litter box 10 so that an average full grown cat can occupy the litter box in the normal manner without his head striking the charcoal tray 22.

The charcoal tray 22 should have a series of apertures of any desired shape, such as round or any other contour extending along both sides and across both ends, to leave an unperforated area 26 in the central part of the charcoal tray 22.

If desired, the charcoal tray 22 can be perforated over the entire area, and then a flat center plate can be secured in the center of the charcoal tray 22.

A removable roof 28 contoured to fit tightly on the top of the shell 12 to close off the entrance of any air getting into the area of the charcoal tray 22 from above.

A cat's entrance and exit accessway 30 to the space within the rectangular shell 12 above the side edges of the litter box 10 and beneath the charcoal tray 22. A hood 32 over the cat's entrance and exit accessway is provided to prevent rising air from escaping from the area within the shell 12.

As shown in FIG. 2, an odor catching flap door 34 preferably made of rubber is shown in FIG. 2 to deflect when the cat enters or leaves the space within the shell 12.

The operation is as follows.

The rectangular shell 12 of the cat house is lifted off of the litter box 10 leaving the litter box on the floor 22. The litter box is preferably taken out of doors and the litter box is emptied and it is then cleaned. A new supply of cat litter of any conventional type is placed in the cat's litter box 10, the supply being such as to fill the litter box 10 about half way up on the sides of the litter box so that the cat will have some incentive to dig in the litter.

A supply of regular charcoal is procured, and it is broken up and put in the charcoal support tray, being careful that it does not extend so high as to prevent the removable roof 28 from closing on the top of the shell 12. That would permit air to enter and that could have the effect of permitting odor to enter the room.

The cat is then introduced to the litter box assembly, and is shown how the odor catching flap door 34 operates. The cat then proceeds to enter and does the usual amount of scratching of the litter and then proceeds to use the litter box in the normal way, and then makes his way out of the assembly.

In approximately one week the litter box 10 should be cleaned. The shell 12 is removed from the litter box 10 and is set to one side. The litter box 10 is then dumped. It is preferable that the litter box be taken out of doors before disturbing it, in order to minimize the odors being left in the home. A new supply of litter is placed in the litter box 10, and the shell 12 is again placed over the litter box. At intervals of approximately one week or less this litter box cleaning operation should be repeated.

It is only necessary to change the charcoal in the charcoal tray 22 about three or four times per year. Preferably a record should be kept as to when the charcoal is changed so that it can be changed again at intervals of three or four times per year.

It appears to be true that cats do not need to have a light available to them while they are in the cat house shell 12. If it should develop that a little light would make the operation more successful, the presence of a small Christmas tree light can be installed and left with the switch in the on position all of the time.

Figure 4:
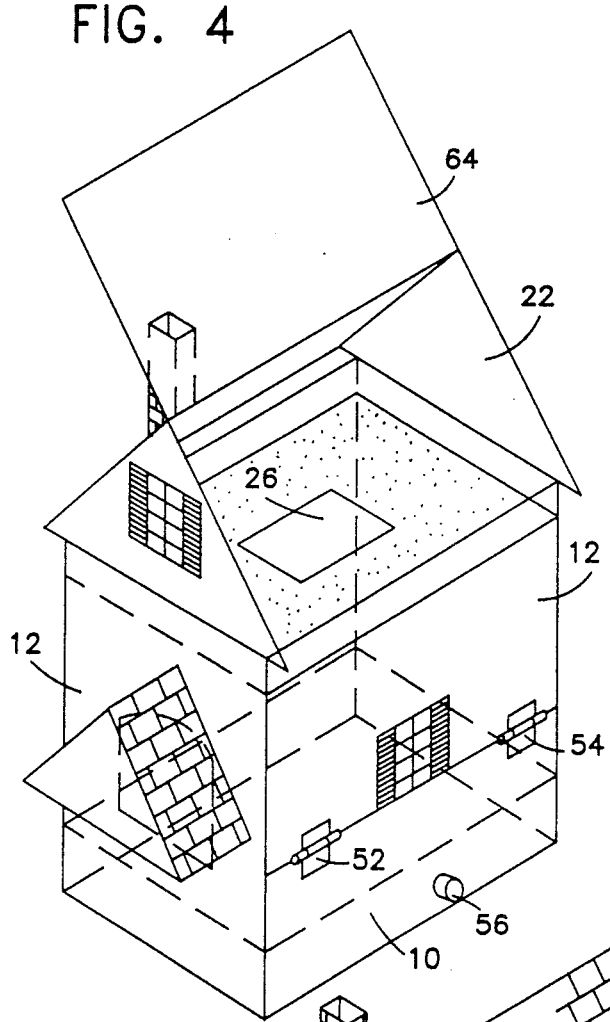
FIGS. 4, 5 and 6 are views similar to FIGS. 1, 2 and 3, showing the Old English style of architecture.
Figure 5:
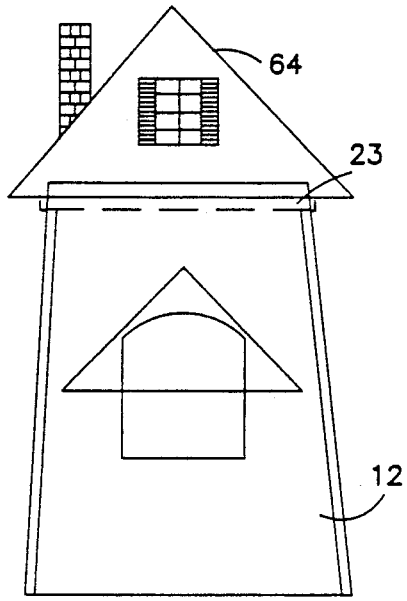
Figure 6:
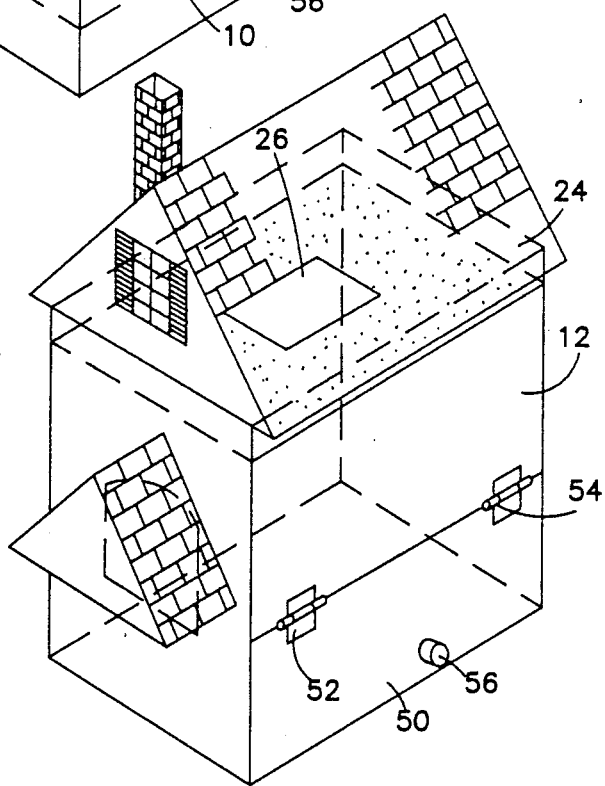

The Old English design of my cat house is illustrated in FIGS. 4 to 6.

The Old English design is similar in many respects to the European design illustrated in FIGS. 1 to 3. Similar parts have therefore been given the same numbers.

Attention is directed to the fact that the side of the house 12 is provided with a hinged flap door 50 hinged by spaced apart hinges 52 and 54. This makes it easier to service the litter box as it needs to receive fresh litter about once a week or less.

To service the unit, it is only necessary to utilize the knob 56 to elevate the hinged flap door 50. The litter box 10 can then readily be lifted out and be taken outside of the home and cleaned to avoid releasing odors within the home. When the litter has been changed in the litter box, it may be in the cat house. Attention is directed to the fact that it is not necessary to make any change in the charcoal in the charcoal tray 22.

It will be noted that a high pitched roof 64 is employed and that the right hand side of the roof 64 is hinged at the peak of the roof so that when it is desired to change the charcoal in the charcoal tray 22, the right hand section as viewed in FIGS. 4 to 6 can be raised to provide access to the tray 22. The charcoal tray can then be picked up out of the upper portion of the cat house sleeve 12, and be taken out of doors and the old charcoal can be disposed of, and a fresh supply of regular charcoal can be placed in the charcoal tray 22. The tray 22 with the fresh charcoal in it can then be brought back into the home and be installed in the upper section of the cat house 12.

It will be noted that in conformity with the details of the Old English design of architecture the Old English style of FIGS. 4 to 6 includes the high pitch roof, the windows with shutters and a gable over the cat entrance to the litter box area.

The Red Barn version of the cat litter assembly is illustrated in FIGS. 7, 8, and 9. In this construction, the cat house has the appearance of the American Red Barn, the front doors 70 and 72 of which are openable and resulting in access to the litter box 10 to clean it, and the litter can be changed by lifting the rectangular shell 12 off the litter box, and placing it over the litter box after the litter box has been cleaned and resupplied with fresh litter.

When the time comes to change the charcoal in the charcoal tray 22, the knob 74 as shown in FIG. 7 is grasped and the charcoal tray is pulled out to the position illustrated in FIG 8. The charcoal tray 22 can then be lifted out and after taking it out of the home to service it, then new charcoal can be placed in the tray 22, care being taken to be sure that the charcoal is not too high in the tray 22 so it can easily be moved to the closed position.

The three pictorial representations of the various styles of architecture, the European of FIGS. 1 to 3; the Old English of FIGS. 4 to 6; and the Red Barn of FIGS. 7 to 9 show a wide divergence of architectural designs so that a homeowner can select the style of architecture that matches the design of their home or meets their fancy.

I claim:

1. A cat odor purification system comprising a cat litter box, a rectangular shell having a plurality of walls and removable roof placed thereon, said shell fits over the litter box, and said roof including a perforated charcoal support tray slidably positioned on a ledge disposed about an upper edge of said plurality of walls and below said roof and is disposed a sufficient distance above the litter box to permit a full grown cat to use the litter box in a normal manner, an unperforated central area of said charcoal support tray induces any rising odorous air within said shell to deflect its flow direction enhancing diffusion of said odorous air and reducing odor within said shell and directing said odorous air to said perforated charcoal support tray that surrounds said unperforated central area, and charcoal is positioned in said tray.

2. The invention defined in claim 1 wherein a cat entrance and exit opening is provided in one of said plurality of said walls above the litter box to admit a cat to an interior space of said shell and said litter box.

3. The invention defined in claim 1 wherein the rectangular shell is approximately 24" in length by 18" wide and 24" in height between the litter box and the charcoal support tray.

4. The invention defined in claim 1 wherein said roof includes a pivoted gabled roof to close a portion above the perforated charcoal support tray, and a cat entrance and exit opening is positioned in one of said plurality of walls above the litter box, and a hood is provided over the entrance and exit opening.

5. The invention defined in claim 1 wherein said unperforated central area is between 10% and 15% of the are of said charcoal support tray, in that, said unperforated central area is at an approximate center of said charcoal support tray that results in said odorous air to deflect and change direction.

* * * * *